(12) United States Patent
Jang (10) Patent No.: US 7,271,968 B2
(45) Date of Patent: Sep. 18, 2007

(54) HEAD PROTECTION CIRCUIT OF HARD DISK DRIVE

(75) Inventor: Eun-kyu Jang, Daegu Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 11/060,498

(22) Filed: Feb. 18, 2005

(65) Prior Publication Data

US 2005/0264908 A1    Dec. 1, 2005

(30) Foreign Application Priority Data

May 29, 2004    (KR)    ............ 10-2004-0038721

(51) Int. Cl.
*G11B 5/09*    (2006.01)
(52) U.S. Cl. ............................ 360/46; 360/67
(58) Field of Classification Search ............ None
See application file for complete search history.

(56) References Cited

U.S. PATENT DOCUMENTS

| | | | |
|---|---|---|---|
| 6,259,573 B1 * | 7/2001 | Tsuwako et al. ............ 360/46 |
| 6,377,411 B1 * | 4/2002 | Katsumata et al. .......... 360/46 |
| 6,400,534 B1 * | 6/2002 | Klaassen .................. 360/323 |
| 6,538,857 B1 * | 3/2003 | Doss et al. ................ 360/323 |
| 6,574,078 B1 * | 6/2003 | Voldman ................... 360/323 |
| 6,972,930 B1 * | 12/2005 | Tang et al. ............... 360/234.5 |
| 7,009,820 B1 * | 3/2006 | Hogg ....................... 360/323 |
| 7,046,488 B1 * | 5/2006 | Hogg ....................... 360/323 |
| 2003/0169540 A1 | 9/2003 | Grandstrom et al. ......... 360/323 |
| 2003/0210501 A1 | 11/2003 | Voldman ................... 360/323 |

FOREIGN PATENT DOCUMENTS

| KR | 1998-036037 | 8/1998 |
|---|---|---|
| KR | 2001-0092393 | 10/2001 |
| KR | 2003-0076371 | 9/2003 |

* cited by examiner

*Primary Examiner*—Andrea Wellington
*Assistant Examiner*—Varsha A. Kapadia
(74) *Attorney, Agent, or Firm*—Staas & Halsey, LLP (57) ABSTRACT

A head protection circuit that protects a write head and a magnetoresistive (MR) read head by bypassing electrostatic charge applied to the write head when the power of a preamplifier is turned "off" includes: a first differential mode switch and a first differential mode resistance connected between each end of the write head; and a first common mode switch and a first common mode resistance connected between one end of the write head and a ground potential. The first differential mode switch and the first common mode switch installed in the preamplifier are turned "on" when the preamplifier is turned "off" and vice versa. The head protection circuit has an effect of protecting the write head and the MR read head by bypassing common mode electrostatic charge and differential electrostatic charge generated at the ends of the write head when the preamplifier is turned "off."

13 Claims, 8 Drawing Sheets

HEAD PROTECTION CIRCUIT OF HARD DISK DRIVE

CROSS-REFERENCE TO RELATED APPLICATION

This application claims the benefit of Korean Patent Application No. 2004-38721, filed on May 29, 2004 in the Korean Intellectual Property Office, the disclosure of which is incorporated herein in its entirety by reference.

BACKGROUND OF THE INVENTION

1. Field of the Invention

The present invention relates to a protection circuit of a hard disk drive, and more particularly, to a head protection circuit that protects a write head and a magneto-resistive (MR) read head by bypassing electrostatic charge applied to the write head when the power of a preamplifier is turned "off."

2. Description of the Related Art

A hard disk drive includes a plurality of heads magnetically paired to rotating magnetic disks. The heads read or write information by magnetizing or sensing a magnetic field of the rotating disks.

The heads are integrated on slider/head units (or a head-gimbal assembly (HGA)), and the slider/head units are typically attached to an actuator arm mounted on a base plate of the hard disk drive in a likely way to rotate through a suspension or a head arm. The actuator arm includes a voice coil coupled to a magnetic assembly (or a yoke) mounted on the base plate. The voice coil forms a voice coil motor together with the magnetic assembly. The voice coil motor rotates the actuator arm to move the heads on the disks. The disks, actuator arm, and voice coil motor are usually assembled within a sealed housing called a hard disk drive assembly (HDA).

Generally, a magnetoresistive (MR) head for reading and an inductive write head installed near the magnetoresistive head for writing are installed on the slider/head units. For convenience, the term MR read-write head is used to denote the MR read head and the write head together or to denote the integration of them.

In the write operation of the hard disk drive, voltages with different waveforms are applied to the ends of the write head. Accordingly, common mode voltage and differential mode voltage exit on the ends of the write head. Due to these voltages, electrostatic charge exists at the ends of the write head, and currents flow to the write head due to the electrostatic charge even after the write operation is finished. Thus, not only is the write head overheated but also the MR read head is affected by a so-called write-to-read (WR) cross-talk, i.e., an interference between signal lines for a pair of differential write signals and signal lines for a pair of differential read signals. Consequently, the MR read head becomes more sensitive to electrostatic discharge (ESD).

On the other hand in the hard disk drive, it is known that electrostatic charge generated between the slider/head unit and the preamplifier, i.e., the head arm (or the suspension), is transmitted to the write head and the MR read head via the signal lines for the pair of write differential signals and the pair of differential read signals, respectively, or the electrostatic charge of the write head are transmitted to the MR read head. The write head can endure relatively high voltage and current because it includes an inductive coil, but the MR read head is especially sensitive to an overload of voltage and current because it is very small. Therefore, when the electrostatic charge is discharged via the MR read head, the MR read head may be damaged.

SUMMARY OF THE INVENTION

The present invention provides a head protection circuit that protects a write head and a magnetoresistive (MR) read head by bypassing electrostatic charge applied to the write head when a preamplifier is not operating.

The present invention also provides an MR read head protection circuit that protects an MR read head by bypassing electrostatic charge applied to the MR read head when a preamplifier is not operating.

According to an aspect of the present invention, there is provided a head protection circuit including: a first differential mode switch and a first differential mode resistance connected between each end of a write head; and a first common mode switch and a first common mode resistance connected between one end of the write head and a ground potential. The first differential mode switch and the first common mode switch are installed in a preamplifier, and are turned "on" when the preamplifier is turned "off" and are turned "off" when the preampfifier is turned "on." Here, resistance value of the first differential mode resistance is lower than an equivalent resistance of the write head.

According to another aspect of the present invention, there is provided a magnetoresistive read head protection circuit including: a differential mode switch and a differential mode resistance connected between each end of a magnetoresistive read head; and a common mode switch and a common mode resistance connected between one end of the magnetoresistive read head and a ground potential. Here, the differential mode switch and the common mode switch are installed on a preamplifier, and are turned "on" when the preamplifier is turned "off" and are turned "off" when the preamplifier is turned "on."

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
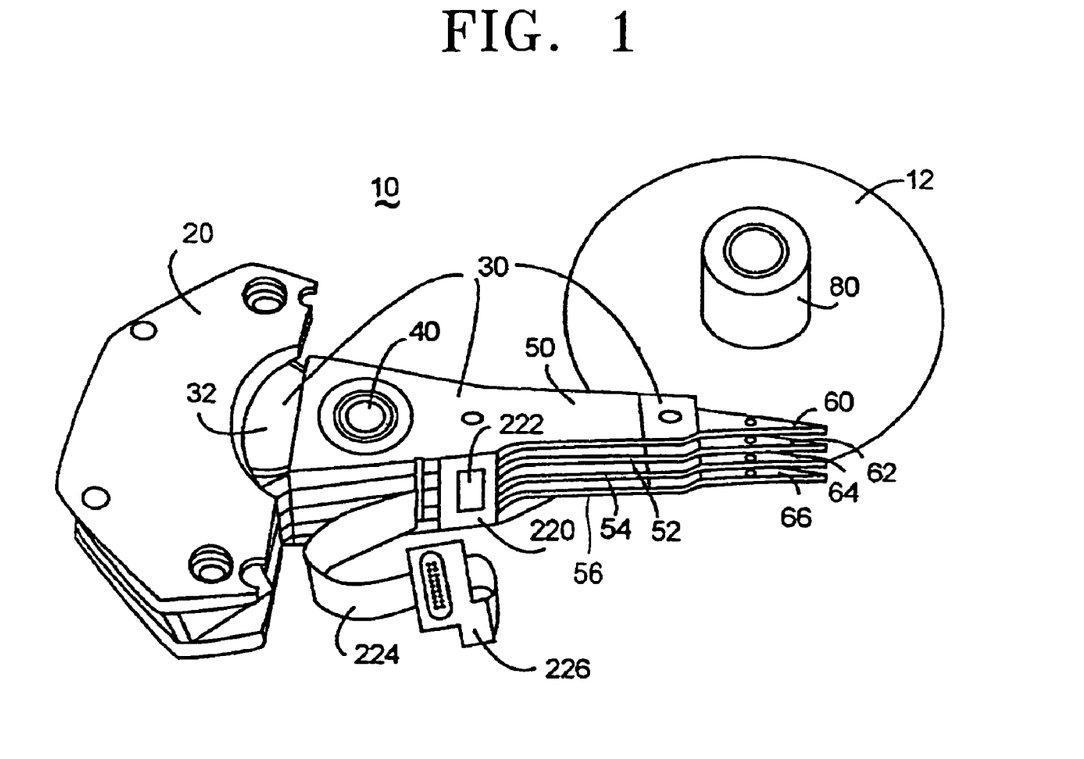
FIG. 1 is a view of a general hard disk drive.

FIG. 1 is a view of a general hard disk drive. As shown in FIG. 1, a general hard disk drive 10 includes an actuator arm 30 having a voice coil 32, an actuator axis 40, and head arms 50 through 56 having slider/head units 60 through 66 located between disks 12.

The actuator arm 30 pivots on the actuator axis 40 within an angular range permitted by a yoke 20 by an interaction between an electromagnetic field induced by the voice coil 32 and a fixed electromagnetic field generated by the fixed yoke 20. Leveraging work by the actuator axis 40 moves the head arms 50 through 56 so that the slider/head units 60 through 66 are accurately-placed on a specific track on the disk 12, which rotates about a spindle axis 80. It is typically considered that the actuator arm 30 includes the voice coil 32, the actuator axis 40, the head arms 50 through 56, and the slider/head units 60 through 66.

On one side of the actuator arm 30, an actuator printed circuit board (PCB) 220 having a preamplifier 222 is installed. A head-gimbal assembly (not shown) is installed on the end of the slider/head units 60 through 66 near the disk 12, and a flexible PCB (not shown) is provided for electrical connection between a magnetoresistive (MR) read-write head of the preamplifier 222 and the head-gimbal assembly.

Figure 2:
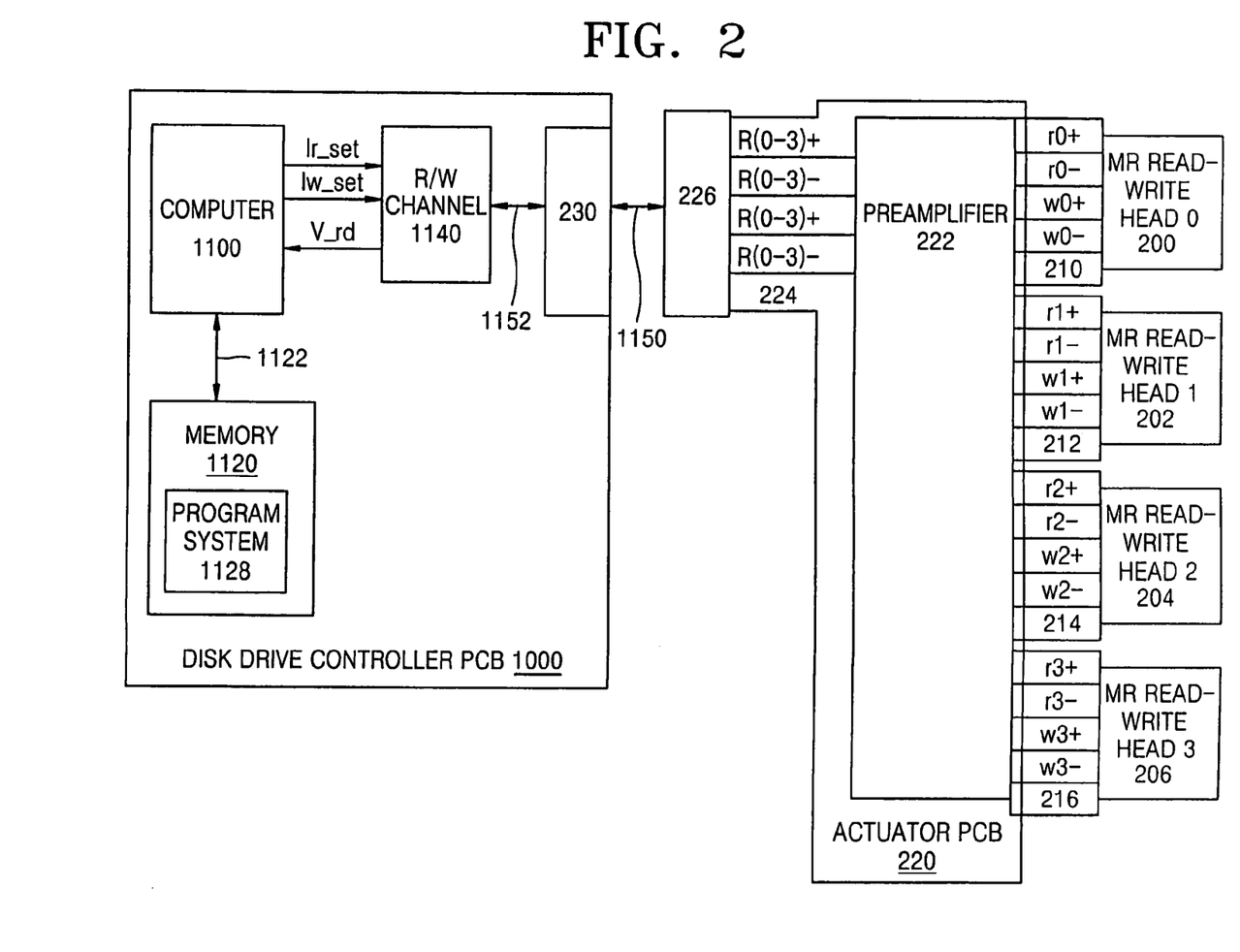
FIG. 2 is a view of circuit blocks that control the hard disk drive of FIG. 1.

FIG. 2 is a view of circuit blocks that control the hard disk drive of FIG. 1. A disk drive controller PCB 1000 includes a computer 1100 that interacts with a read/write (R/W) channel circuit 1140. The R/W channel circuit 1140 controls the preamplifier 222, which communicates with MR read-write heads 200 through 206 using a pair of differential read signals (r+ and r−) and a pair of differential write signals (w+ and w−). A connector 226 is connected to a connector 230 to electrically connect the R/W channel 1140 to the MR read-write heads 200 through 206 via the preamplifier 222.

On one side, the actuator PCB 220 is connected to the MR read-write heads 200 through 206 via flexible PCBs 210 through 216, and on the other side, the actuator PCB 220 is connected to the connector 226 via another flexible PCB 224. The computer 1100 within the disk drive controller PCB 1000 controls not only a write current lw_set for the pair of differential write signals (w+ and w−) but also controls a read current lr_set for the pair of differential read signals (r+ and r−).

Figure 3:
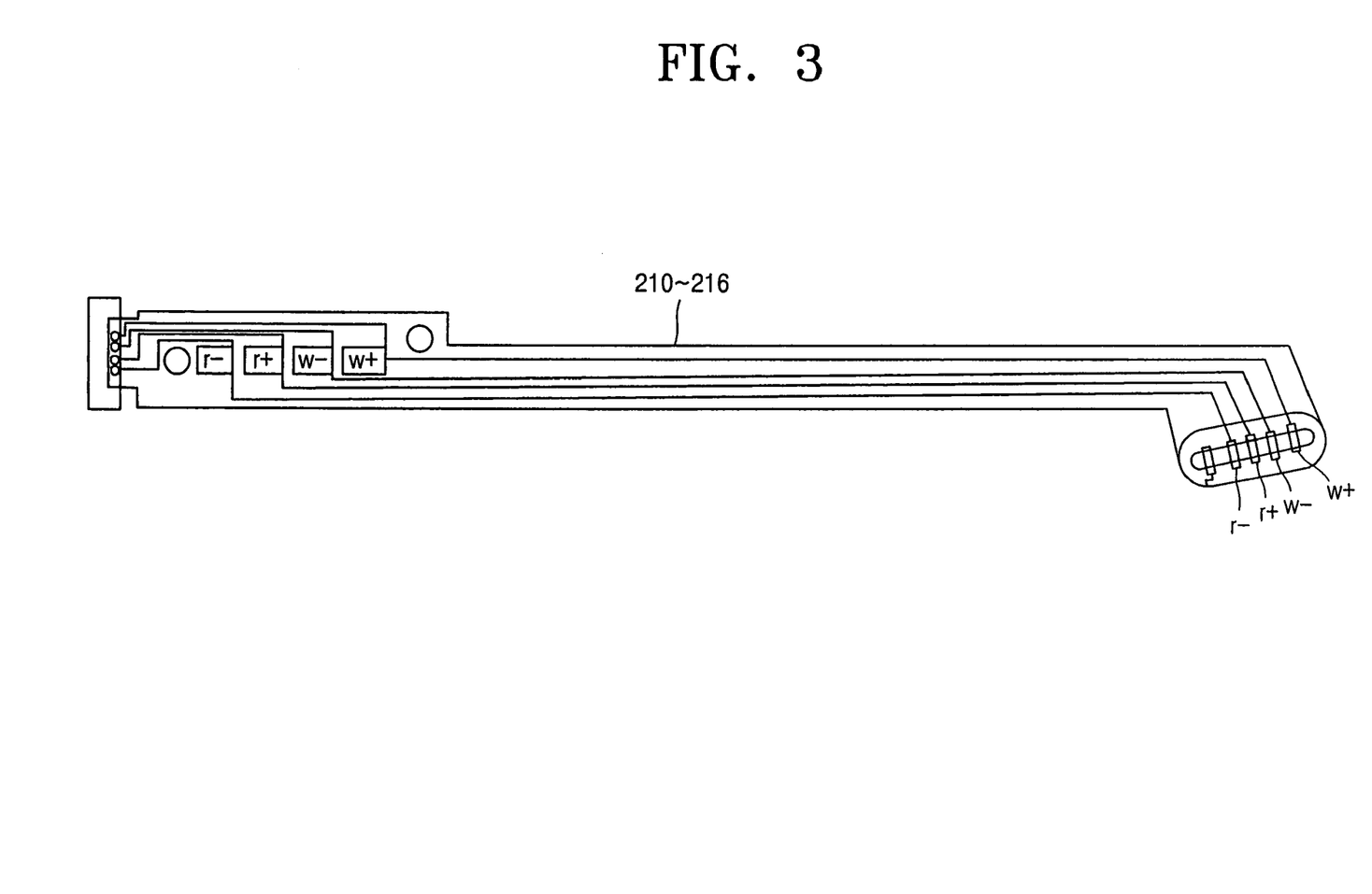
FIG. 3 is a view of a flexible printed circuit board (PCB) that connects a preamplifier and a magnetoresistive (MR) read-write head.

FIG. 3 is a view of the flexible PCBs 210 through 216 that connect the preamplifier 222 and the MR read-write heads 200 through 206. One end of the flexible PCBs 210 through 216 is connected to the preamplifier 222 and the other end of the flexible PCBs 210 through 216 is connected to the read-write heads 200 through 206. The flexible PCBs 210 through 216 are installed along the head arms 50 through 56.

Figure 4:
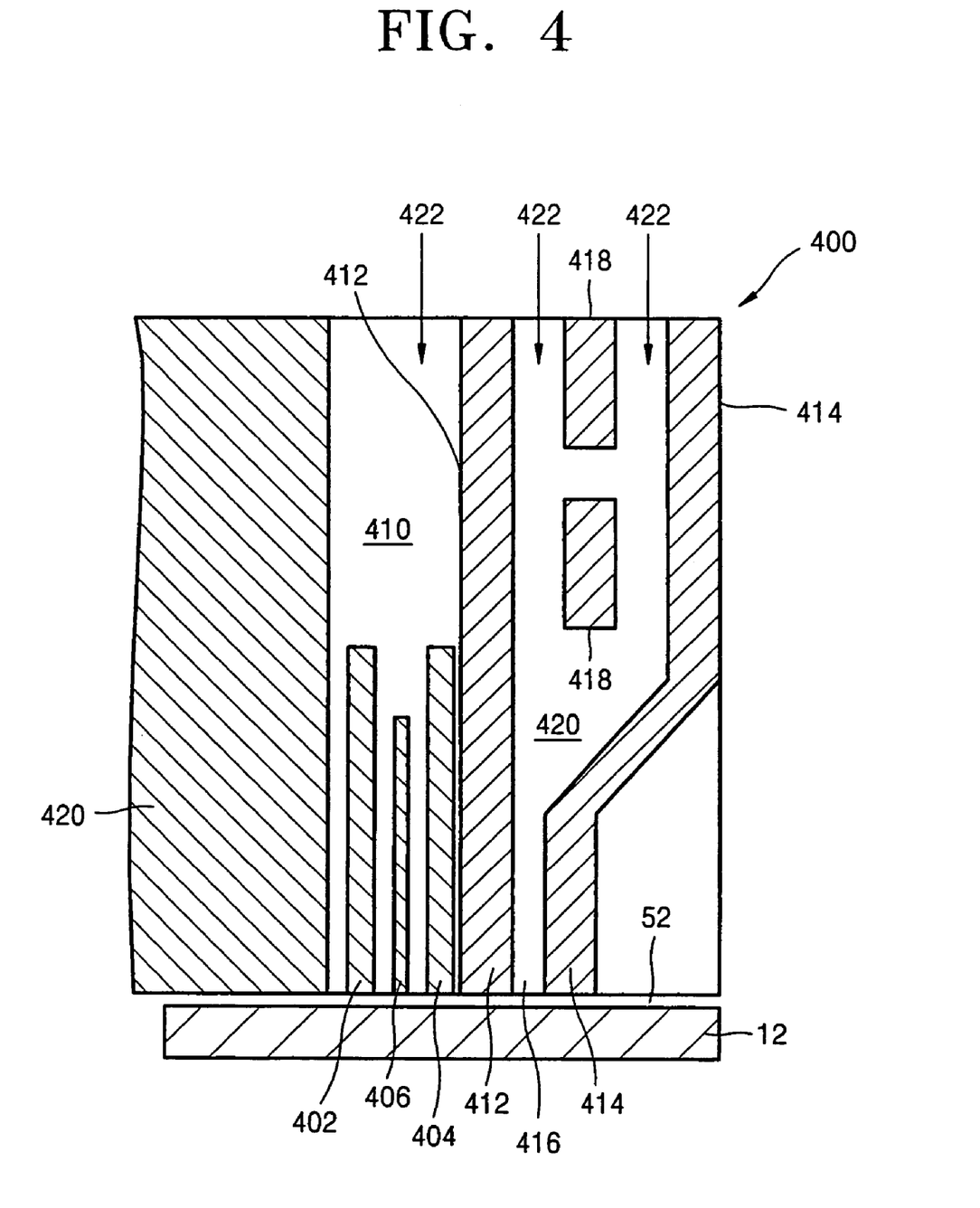
FIG. 4 is a cross-sectional view of a general MR read-write head integrated on a slider/head unit.

FIG. 4 is a cross-sectional view of a general MR read-write head 400 integrated on the slider/head units 60 through 66. Referring to FIG. 4, the MR read-write head 400 includes an MR read head 410 and an inductive write head 420 formed adjacent to the MR read head 410. A conventional MR read head is composed of ferromagnetic materials, for example, nickel-iron (NiFe) alloy, and includes an anisotropic magnetoresistive (AMR) sensor 406 surrounded by first and second magnetic shielding elements 402 and 404. The first and second magnetic shielding elements 402 and 404 are generally composed of magnetic materials with high magnetic conductivity, such as NiFe, sandust, aluminum-silicon-iron alloy, etc. The first and second magnetic shielding elements 402 and 404 minimize the effect of magnetic interference on the MR sensor 406. The MR sensor 406 is connected to the preamplifier 222 of FIG. 1 through conductive leads (not shown) mounted on the ends of the MR sensor 406 to read a signal recorded on the disk 12. The signal recorded on the disk 12 is read by sensing the resistance of the MR sensor 406, and the MR read-write head 400 travels above the disk 12 with a gap 52 in between.

The inductive write head 420 includes first and second magnetic pole pieces 412 and 414. A magnetic loop is formed by the first and second magnetic pole pieces 412 and 414 and a magnetic gap 416, and a signal is recorded on the disk 12 by a magnetic flux that leaks from the magnetic gap 416. A recording coil 418 is disposed between the first and second magnetic pole pieces 412 and 414. The recording coil 418 is formed by, for example, a conductor composed of copper (Cu). The recording coil 418 is connected to the preamplifier 222 via the conductive leads.

The MR read head is formed on a substrate 440 using a known vacuum deposition technique such as sputter deposition. Layers 422 formed of insulating materials surround the MR read-write head to insulate the MR read-write head. The layers 422 are composed of, for example, silicon dioxide ($SiO_2$) or aluminum oxide ($Al_2O_3$).

Figure 5:
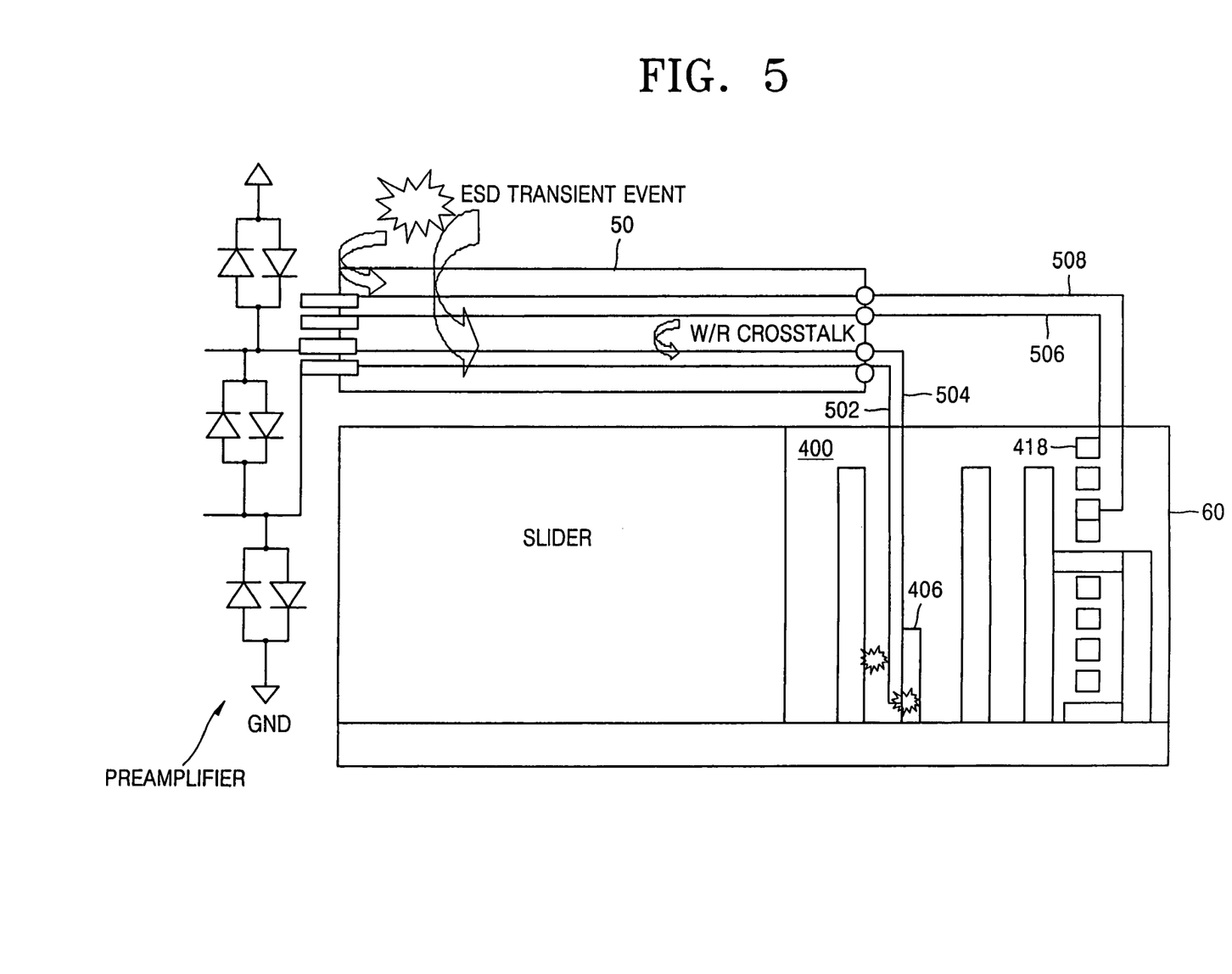
FIG. 5 is a view illustrating an effect of an electrostatic discharge (ESD) event erupted between the MR read-write head and the preamplifier.

FIG. 5 is a view illustrating an effect of an electrostatic discharge (ESD) event generated between the MR read-write head 400 and the preamplifier 222. Here, the ESD event denotes an event in which electrostatic charge is applied to a hard disk drive. For example, an operator can apply electrostatic charge to the hard disk drive during the assembly process of the hard disk drive.

In FIG. 5, the MR read-write head 400 is connected to the preamplifier 222 via the head arms 50 through 56. The pairs of differential read and write signals are transmitted between the preamplifier 222 and the MR read-write head 400 via the flexible PCBs 210 through 216 of FIG. 3. The flexible PCBs 210 through 216 are installed on the head arms 50 through 56 (refer to FIG. 1).

As illustrated in FIG. 5, the electrostatic charge charged at the head arms 50 through 56 is transmitted to signal lines 502 and 504 of the pair of differential read signals and to signal lines 506 and 508 of the pair of differential write signals of the flexible PCBs 210 installed on the head arms 50 through 56.

The electrostatic charge transmitted to the signal lines 506 and 508 of the pair of differential write signals may damage the MR sensor 406 when the MR sensor 406 discharges the electrostatic charge. Meanwhile, the electrostatic charge transmitted to the signal lines 502 and 504 of the pair of differential read signals heats the write head 420 by flowing through the write coil 418. The heat produced by the write head 420 heats the MR sensor 406, and accordingly, the MR sensor 406 is affected more by the ESD.

Figure 6:
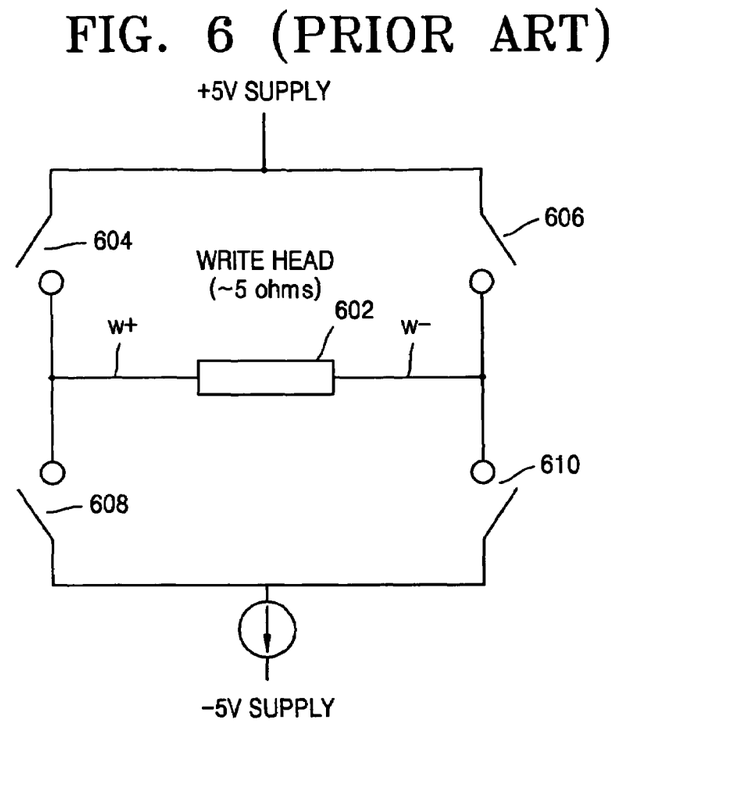
FIG. 6 is a view of a write circuit of a conventional hard disk drive.

FIG. 6 is a view of a write circuit of a conventional hard disk drive. As illustrated in FIG. 6, the conventional write circuit includes a write head 602 and first through fourth switches 604 through 610. Here, the write head 602 is illustrated to show the equivalent resistance of the write head 602, especially the write coil 418, of FIG. 4.

In the write head 602, current should flow alternately in the clockwise and counterclockwise direction. To do so, the first and fourth switches 604 and 610 form a first pair of switches and the second and third switches 606 and 608 form a second pair of switches and operate alternately. That is, when the current flows in the clockwise direction, the first and fourth switches 604 and 610 are turned "on," and the second and third switches 606 and 608 are turned "off." On the other hand, when the current flows in the counterclockwise direction of the write head 602, the first and fourth switches 604 and 610 are turned "off", and the second and third switches 606 and 608 are turned "on."

The behavior of the write current in an actual write operation is more complex than illustrated in FIG. 6. According to FIG. 6, the clockwise and counterclockwise direction of the write current is illustrated as being symmetrical. However, as widely known, write currents in the clockwise and counterclockwise direction become asymmetrical when considering coercivity of the disk 12. Due to such asymmetry, waveforms of the pair of differential write signals (w+ and w−) applied to the ends of the write head 602 should also be asymmetrical.

Figure 7A:
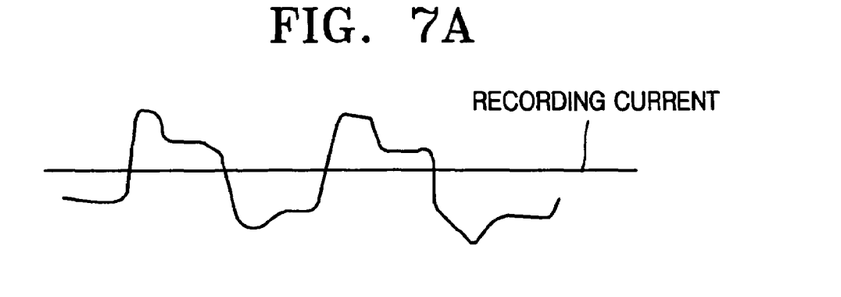
FIGS. 7A and 7B are views of waveforms of a write current applied to a write head and a read current applied to an MR read head.
Figure 7B:
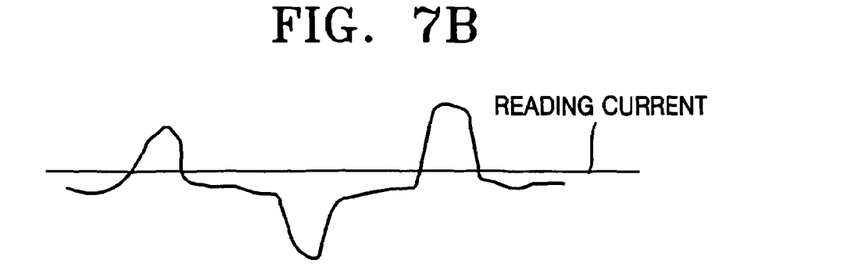

FIGS. 7A and 7B are views of the waveforms of a write current applied to the write head and a read current applied to the MR read head. When current as illustrated above the centerline of FIGS. 7A and 7B is applied to the write head 602, the current flows clockwise into the write head 602. Meanwhile, when current as illustrated below the centerline in FIGS. 7A and 7B is applied to the write head 602, the current flows counterclockwise into the write head 602. Accordingly, because currents flowing clockwise and counterclockwise are asymmetrical, the pair of differential write signals (w+ and w−) applied to both the ends of the write head 602 should also be asymmetrical.

Similarly, because the read current flowing to the MR read head is asymmetrical with respect to the centerline, waveforms of the pair of differential read signals are also asymmetrical. As is well known in the field of differential amplifiers, since the pair of differential write signals applied to both ends of the write head 602 are asymmetrical, common mode voltage and differential mode voltage exists at both ends of the write head 602.

When the write operation is not performed, all switches 604 through 610 are turned "off" in the circuit illustrated in FIG. 6. Here, common mode electrostatic charge and differential mode electrostatic charge are respectively generated by the common-mode voltage and differential mode voltage existing at the ends of the write head 602. The currents flow through the write head 602 by the common mode electrostatic charge[s] and differential mode electrostatic charge, and accordingly, write-to-read (WR) cross-talk and heating of the write head occurs. Due to the WR cross talk and heating of the write head, the MR read head is even more affected by the electrostatic discharge.

Figure 8:
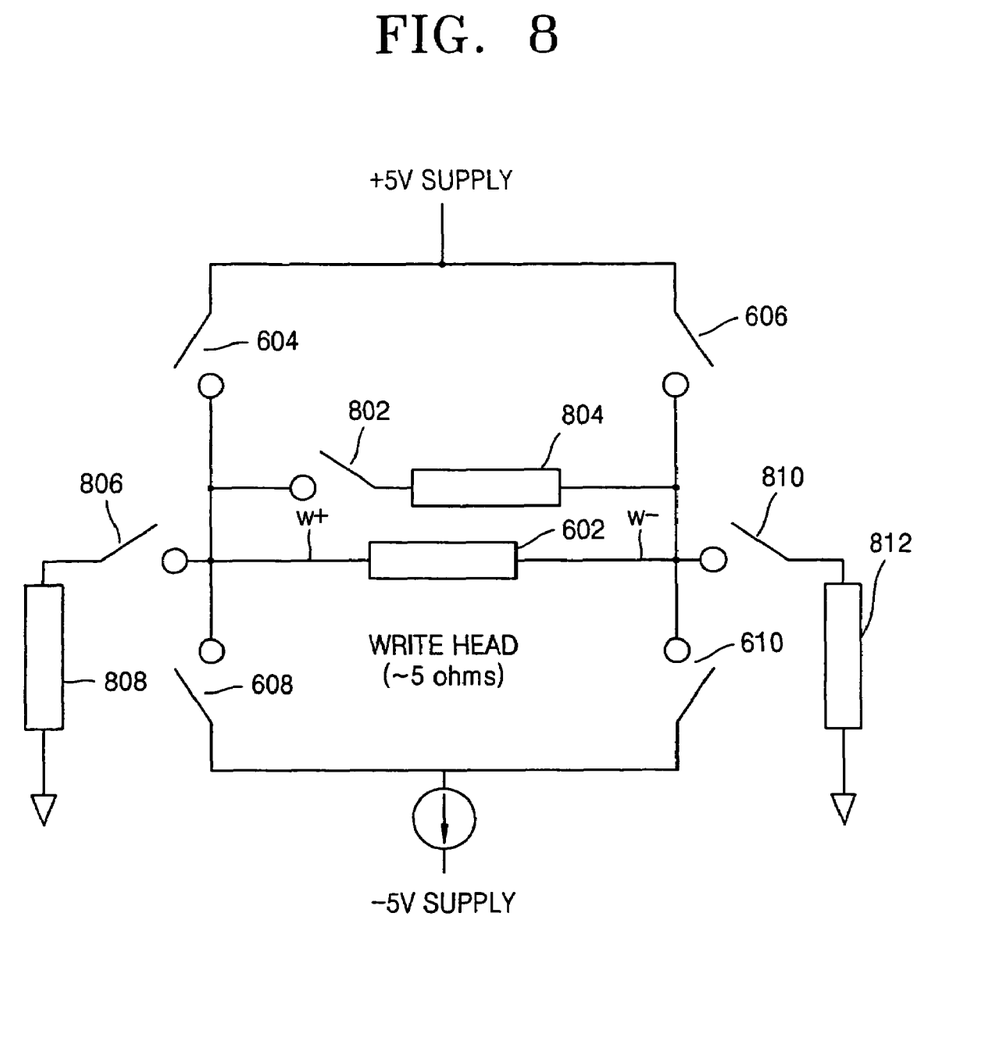
FIG. 8 is a view of a head protection circuit according to an embodiment of the present invention.

FIG. 8 is a view of a head protection circuit according to an embodiment of the present invention. The head protection circuit of FIG. 8 has identical reference numerals to the elements of the device of FIG. 6 that perform identical operations, and details of the operations of those elements will be omitted.

The head protection circuit of FIG. 8 according to an embodiment of the present invention includes a differential mode switch 802, a differential mode resistance 804, first and second common mode switches 806 and 810, and first and second common mode resistances 808 and 812 connected between the ends of a write head 602 and ground.

When the power of a preamplifier 222 (not shown) is "off," the differential mode switch 802, and the first and second common mode switches 806 and 810, for example, do not perform the write operation or are turned "on" while a hard disk drive is being assembled and turned "off" for other instances. That is, when the write operation is being performed, the differential mode switch 802, and the first and second common mode switches 806 and 808 are all turned "off," and the first through fourth switches 604 through 610 operate, thereby supplying write current to the write head 602. On the other hand, the differential mode switch 802, and the first and second common mode switches 806 and 810 are all turned "on" when the preamplifier is turned "off," and the first through fourth switches 604 through 610 are all turned "off."

Preferably, the resistance value of the differential mode resistance 804 is lower than the equivalent resistance of the write head 602. For example, if the equivalent resistance of the write head 602 is 5 ohms and the resistance of the differential mode resistance 804 is 1 ohm, when the differential mode switch 802 is turned "on," the differential mode electrostatic charge at the ends of the write head 602 flows toward the differential mode resistance 804. Accordingly, the write head 602 is prevented from being heated.

On the other hand, the resistance values of the common mode resistances 808 and 812 are preferably higher than the equivalent resistance of the write head 602. For example, if the equivalent resistance of the write head 602 is 5 ohms and the resistance of the common mode resistances 808 and 812 are 50 ohms, when the common mode switches 806 and 810 are turned "on," the common mode electrostatic charge at the ends of the write head 602 flows toward the common mode resistances 808 and 812. Here, it should be noted that the common mode resistances 808 and 812 are respectively connected between the write head 602 and the ground potentials. Accordingly, the write head 602 is prevented from being heated. In addition, since the electrostatic charge applied to the ends of the write head 602 is dissipated through the differential mode resistance and the common mode resistances, negative effects on the MR read head caused by WR cross talk are prevented.

The electrostatic charge, other than the common mode electrostatic charge and the differential mode electrostatic charge that is applied to the write head 602 through another path, is discharged to the ground potentials through the common mode resistances 808 and 812. That is, even if the electrostatic charge applied through head arms 50 through 56 is applied to the write head 602, the electrostatic charge is applied to the ground through the common mode resistances 808 and 812 and not connected to the MR read head, thereby protecting the MR read head from the electrostatic discharge.

In the circuit of FIG. 8, the differential mode switch 802, the first and second common switches 806 and 810, the differential mode resistance 804, and the first and second common mode resistances 808 and 812 are installed in the preamplifier 222. The differential mode switch 802 and the first and second common switches 806 and 810 may be designed to operate in response to the power voltage applied to the preamplifier 222. When the power voltage of the preamplifier 222 is turned "off," the differential mode switch 802 and the first and second common switches 806 and 810 are turned "on," and vice versa.

In the write head protection circuit according to an embodiment of the present invention, the voltage and electrostatic charge applied to the write head 602 is bypassed using the differential mode resistance 804 and first and second common mode resistances 808 and 812 instead of a diode, because the characteristics of the diode makes it difficult to respond to an ESD lower than nS. Similarly, bypassing the electrostatic charge using the resistance protects the MR read head.

Figure 9:
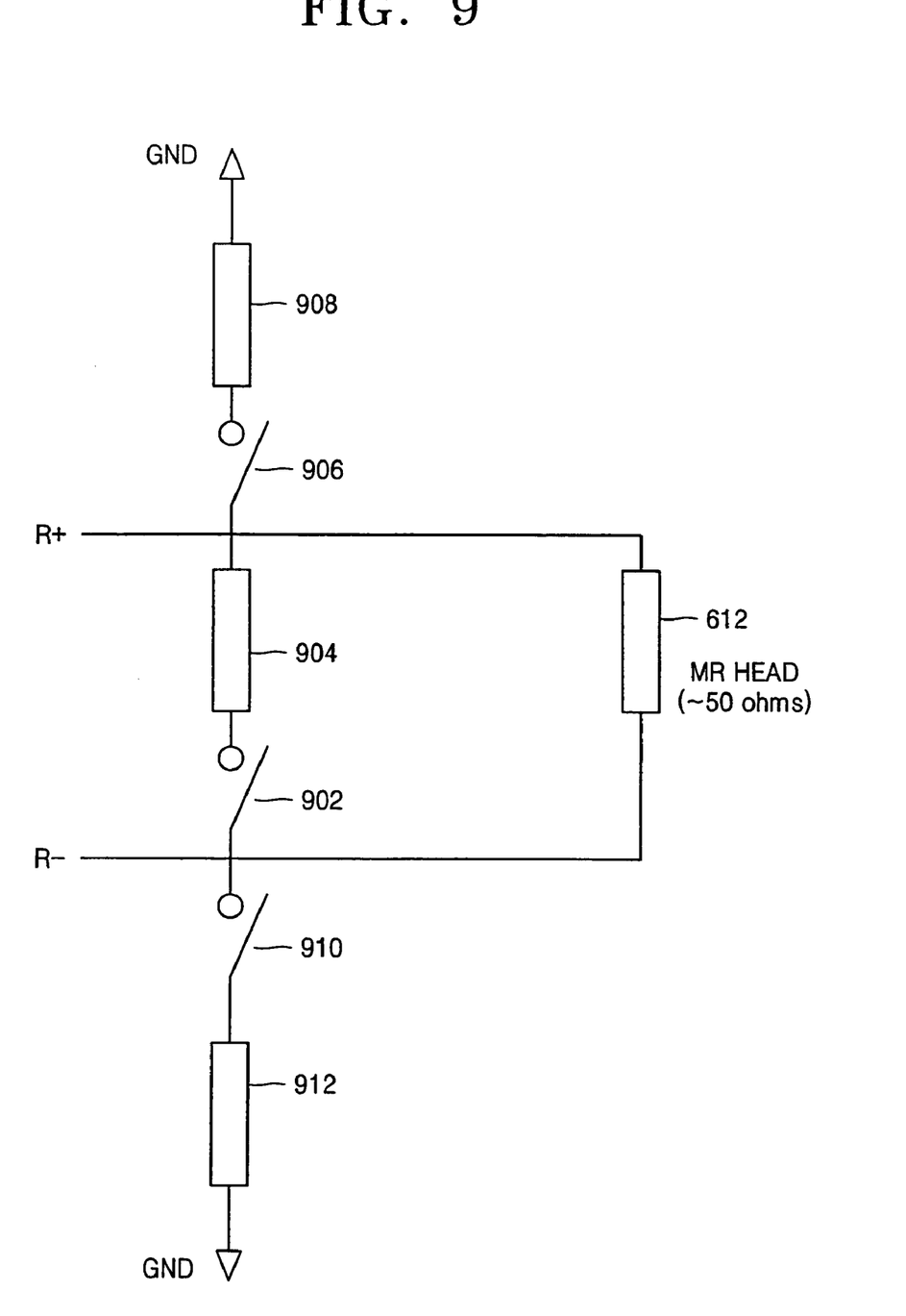
FIG. 9 is a view of a section protecting an MR read head in the head protection circuit according to the embodiment of the present invention.

FIG. 9 is a view of a section of a circuit protecting an MR read head 612 in a head protection circuit according to another embodiment of the present invention. The circuit illustrated in FIG. 9 includes a differential mode switch 902 and a differential mode resistance 904 connected between the ends of the MR read head 612, and a first common mode switch 906 and a first common mode resistance 908 connected between one end of the MR read head 612 and ground, and a second common mode switch 910 and a second common mode resistance 912 connected between the other end of the MR read head 612 and ground.

Except when the power of the preamplifier 22 is "off" (e.g., the write operation is not being performed or when the hard disk drive is being assembled), the differential mode switch 902, and the first and second common mode switches 906 and 910 are turned "on."

Since the operations and the effect introduced by the differential mode switch 902, the first and second common mode switches 906 and 910, the differential mode resistance 904, and the first and second common mode resistances 908 and 912 are similar to those of the write head protection circuit in FIG. 7, details thereof will be omitted.

The resistance value of the differential mode resistance 904 is set to be relatively lower than that of the MR read head 612. For example, if the equivalent resistance of the MR read head 612 is 50 ohms and the resistance of the differential mode resistance 904 is 1 ohm, when the differential mode switch 902 is turned "on," the differential mode electrostatic charge at the ends of the MR read head 612 flows towards the differential mode resistance 904.

On the other hand, the resistance values of the common mode resistances 908 and 912 are set to be the same as or higher than that of the MR read head 612. For example, if the equivalent resistance of the MR read head 612 is 50 ohms and the resistance of the common mode resistances 908 and 912 are 500 ohms, when the common mode switches 906 and 910 are turned "on," the common mode electrostatic charge at the ends of the MR read head 612 flows toward the common mode resistances 908 and 912.

As described-above, a head protection circuit according to an embodiment of the present invention protects a write head and an MR read head by bypassing common mode electrostatic charge and differential mode electrostatic charge generated at the ends of the write head when a preamplifier is turned "off." In addition, the head protection circuit protects the write head and the MR read head by bypassing the common mode electrostatic charge and the differential mode electrostatic charge applied to the write head via head arms when the preamplifier is turned "off."

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A head protection circuit of a hard disk drive, the head protection circuit comprising:

a first differential mode switch and a first differential mode resistance connected between each end of a write head; and a first common mode switch and a first common mode resistance connected between one end of the write head and a ground potential, wherein the first differential mode switch and the first common mode switch are installed in a preamplifier, and are turned "on" when the preamplifier is turned "off" and are turned "off" when the preamplifier is turned on, and wherein a resistance value of the first differential mode resistance is lower than an equivalent resistance of the write head.

2. The head protection circuit of claim 1, further comprising:

a second differential mode switch and a second differential mode resistance connected between each end of a magnetoresistive read head; and a third common mode switch and a third common mode resistance connected between one end of the magnetoresistive read head and the ground potential, wherein the second differential mode switch and the third common mode switch are installed in the preamplifier, and are turned "on" when the preamplifier is turned "off" and are turned "off" when the preamplifier is turned "on."

3. A head protection circuit of a hard disk drive, the head protection circuit comprising:

a first differential mode switch and a first differential mode resistance connected between each end of a write head; and a first common mode switch and a first common mode resistance connected between one end of the write head and a ground potential, wherein the first differential mode switch and the first common mode switch are installed in a preamplifier, and are turned "on" when the preamplifier is turned "off" and are turned "off" when the preamplifier is turned "on", and wherein a resistance value of the first common mode resistance is higher than an equivalent resistance of the write head.

4. A magnetoresistive read head protection circuit of a hard disk drive, comprising:

a differential mode switch and a differential mode resistance connected between each end of a magnetoresistive read head; and a common mode switch and a common mode resistance connected between one end of the magnetoresistive read head and a ground potential, wherein the differential mode switch and the common mode switch are installed on a preamplifier, and are turned "on" when the preamplifier is turned "off" and are turned "off" when the preamplifier is turned "on," and wherein, when the common mode switch is turned "on," a common mode electrostatic charge at the ends of the head flows through the common mode resistance to the ground potential.

5. A head protection circuit of a hard disk drive, the head protection circuit comprising:

a differential mode switch and a differential mode resistance connected between each end of a head;

a first common mode switch and a first common mode resistance connected between one end of the head and a reference level;

a second common mode switch and a second common mode resistance connected between the other end of the head and the reference level, wherein the differential mode switch and the first and second common mode switches are turned "on" when a preamplifier is turned "off" and are turned "off" when the preamplifier is turned "on," and wherein, when the common mode switch is turned "on," a common mode electrostatic charge at the ends of the head flows through the common mode resistance to the reference level.

6. The head protection circuit of claim 5, wherein when the first and second common mode switches are turned "on," a common mode electrostatic charge at the ends of the head flows towards the first and second common mode resistances, preventing heating of the head.

7. The head protection circuit of claim 5, wherein electrostatic charge other than common mode electrostatic charge and differential mode electrostatic charge is discharged to the reference level through the first and second common mode resistances.

8. The head protection circuit of claim 5, wherein the differential mode switch, the differential mode resistance, the first and second common mode switches and the first and second common mode resistances are installed in the preamplifier.

9. The head protection circuit of claim 5, wherein the differential mode switch and the first and second common mode switches operate in response to a power voltage applied to the preamplifier.

10. The head protection circuit of claim 5, wherein a voltage and electrostatic charge applied to the head is bypassed using the differential mode resistance and the first and second common mode resistances.

11. The head protection circuit of claim 5, wherein the head includes a write head and a read head.

12. The head protection circuit of claim 11, wherein the read head is a magnetoresistive read head.

13. The head protection circuit of claim 5, wherein the reference level is a ground potential.

* * * * *